Sept. 20, 1966   B. McCOLLUM   3,274,543
MEANS AND METHOD OF DISTINGUISHING SEISMIC SIGNALS
Filed Oct. 11, 1963   7 Sheets-Sheet 2

INVENTOR.
Burton McCollum
BY Bertram A. Mann
ATTORNEY

Sept. 20, 1966    B. McCOLLUM    3,274,543
MEANS AND METHOD OF DISTINGUISHING SEISMIC SIGNALS
Filed Oct. 11, 1963    7 Sheets-Sheet 3
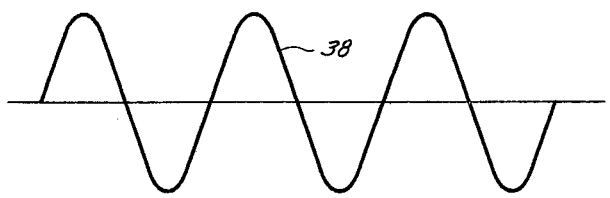
Fig. 3
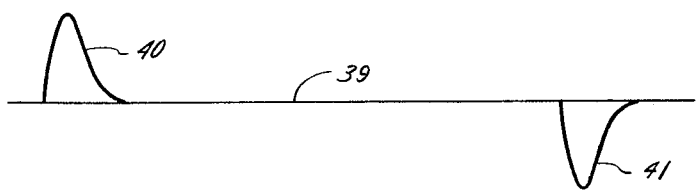
Fig. 3A
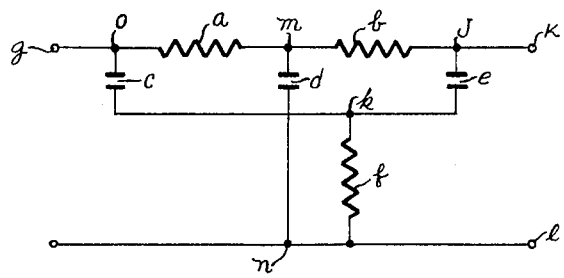
Fig. 4
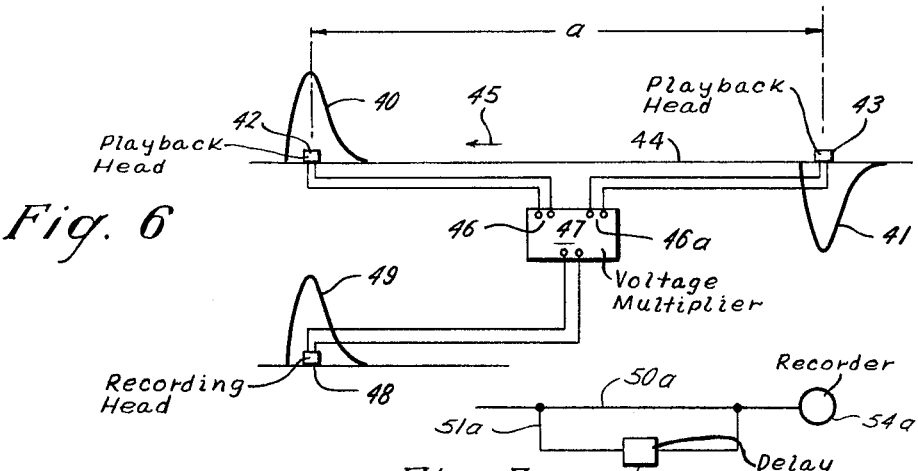
Fig. 6
Fig. 4A    Fig. 5
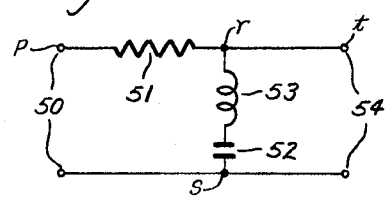
INVENTOR.
Burton McCollum
BY
Bertram & Mann
ATTORNEY

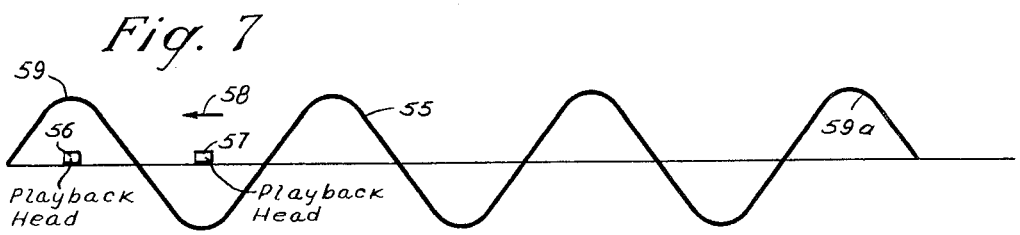
Fig. 7
Fig. 7A
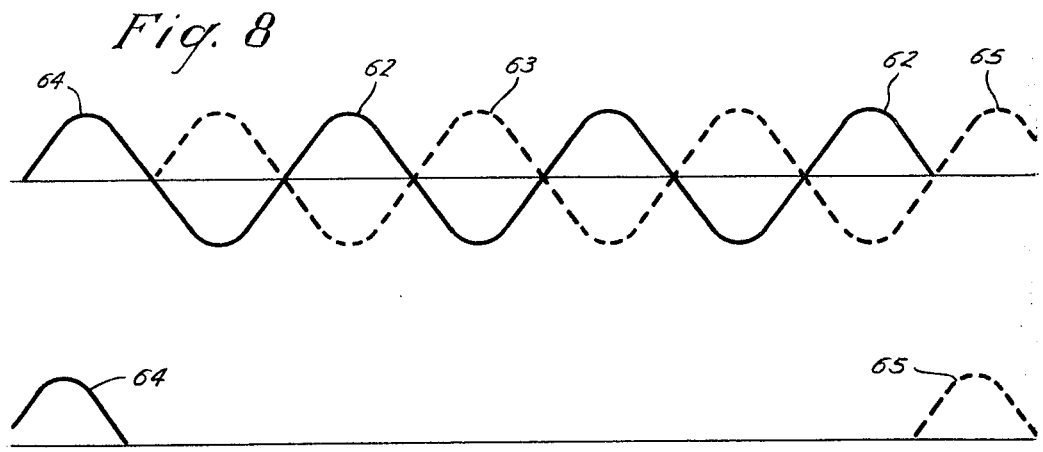
Fig. 8
Fig. 8A

Sept. 20, 1966  B. McCOLLUM  3,274,543
MEANS AND METHOD OF DISTINGUISHING SEISMIC SIGNALS
Filed Oct. 11, 1963  7 Sheets-Sheet 5
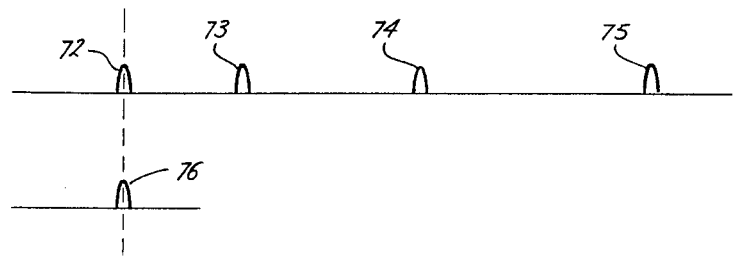
Fig. 10
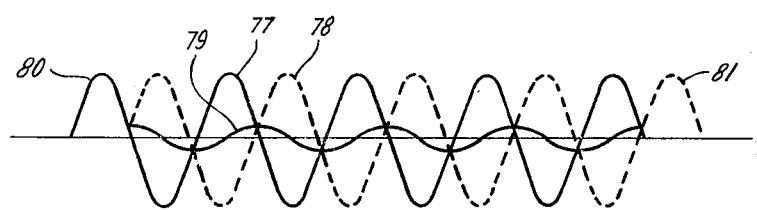
Fig. 11
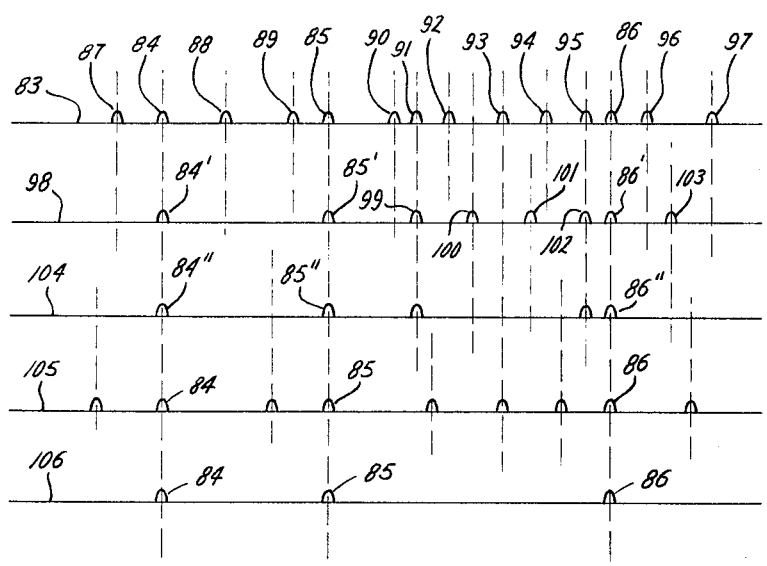
Fig. 12
Fig. 13
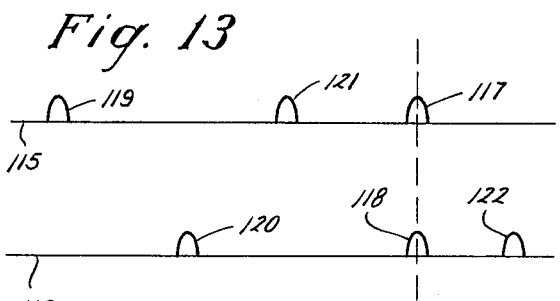
INVENTOR.
Burton McCollum
BY
Bertram A. Mann
ATTORNEY

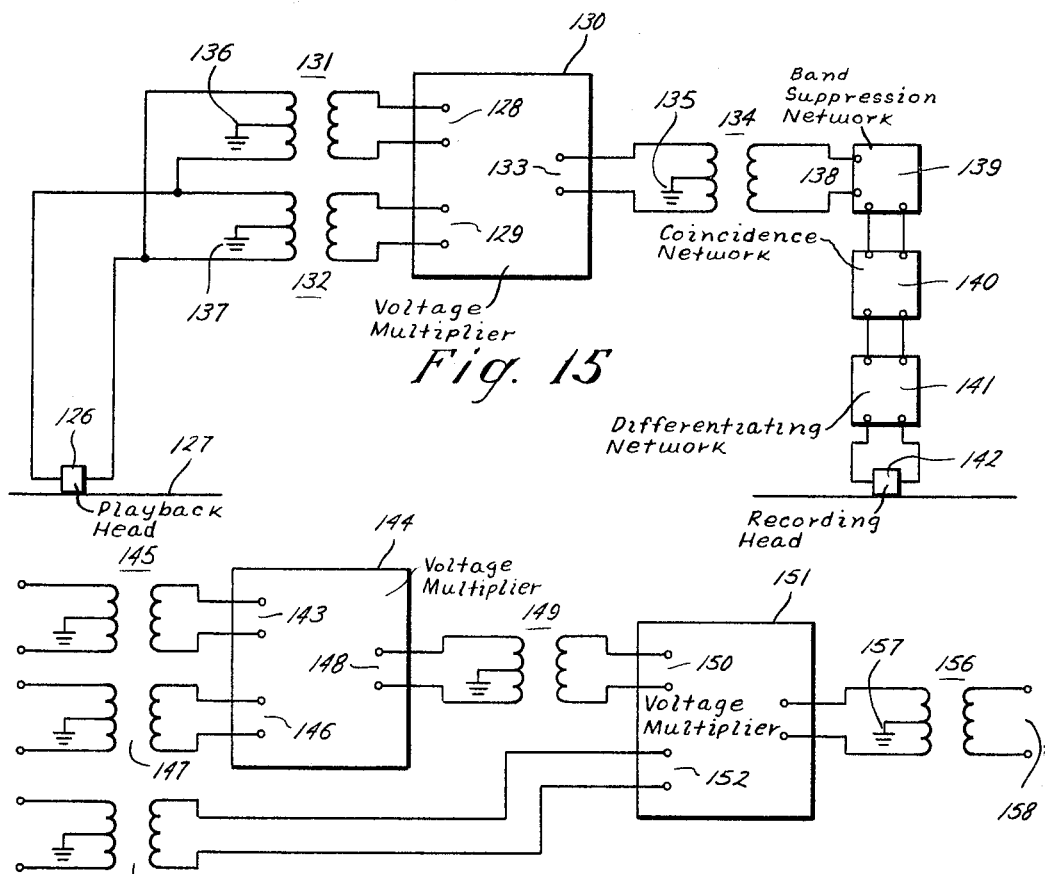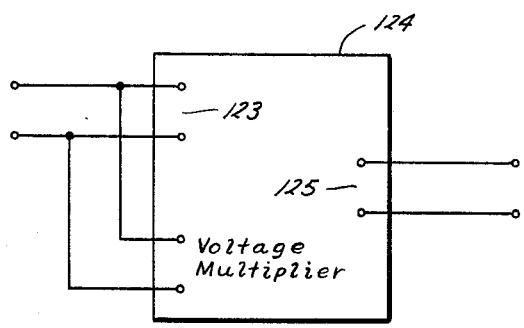

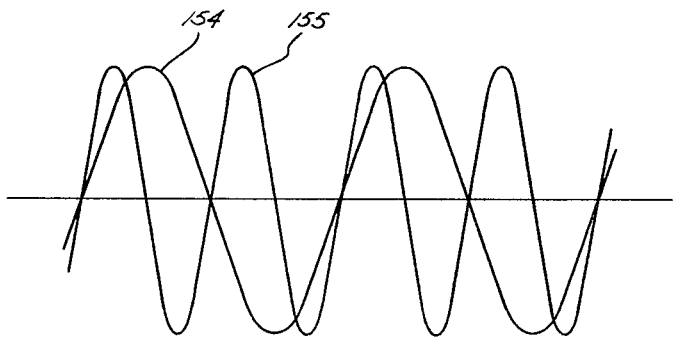
Fig. 17
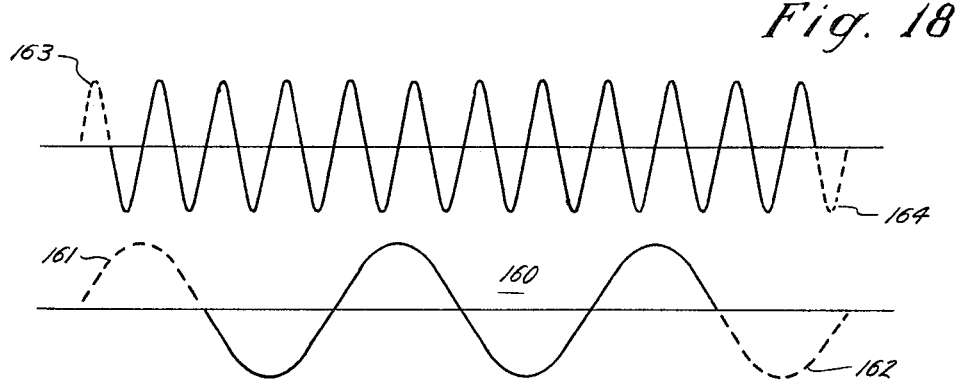
Fig. 18
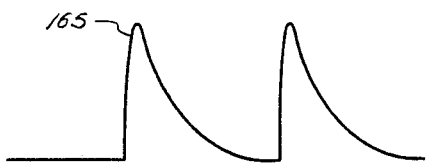
Fig. 19
INVENTOR.
Burton McCollum
BY
Bertram H. Mann
ATTORNEY

United States Patent Office 3,274,543
Patented Sept. 20, 1966

3,274,543
MEANS AND METHOD OF DISTINGUISHING
SEISMIC SIGNALS
Burton McCollum, Houston, Tex.; P. R. Rowe and Bank of The Southwest National Association, Houston, Tex., executors of said Burton McCollum, deceased
Filed Oct. 11, 1963, Ser. No. 315,620
17 Claims. (Cl. 340—15.5)

This invention relates primarily to geophysical exploration by means of the seismograph, and consists in novel means and methods of eliminating noise and other unwanted components from the records, and particularly to better discriminate between reflections from closely associated horizons.

In the art of exploring subsurface geology by means of the seismograph, serious limitations are often encountered due, in particular, to three causes. One of these is the presence on the records of random noises of such magnitude that the relatively weak signals may be entirely obscured. In present practice a great deal can be accomplished in the direction of noise elimination by the use of frequency discriminating filters, since much of the noise is usually of different frequency from that of the desired signals. However, there will often be overriding noise of substantially the same frequency as the signals, and this noise cannot be avoided by frequency discrimination alone. To meet this problem it is necessary to devise techniques whereby noise of the same frequency as the signals can be separated and eliminated while conserving the desired signals.

A second difficulty results from the well known fact that when a signal is radiated in the earth, there will be generated, not only vertically traveling waves required to yield information regarding the subsurface horizons, but there will also be horizontally traveling waves that yield no useful information, but often obscure the relatively weak reflected events.

Another, and very serious difficulty, arises from the fact that reflecting horizons are often so closely associated that the signals reflected from them overlap on the records, thereby rendering it difficult or impossible to determine the presence and time of arrival of the individual signals. In order to distinguish between reflected events coming from closely associated horizons, it is desirable that the signals be of very short duration, so as to avoid the confusion of overlap. However, short duration involves short wave length, and it is well known that signals of short wave length are absorbed in the earth much more rapidly than those of longer wave length, and this absorption may be so great that the reflected signals received at the detectors will be too weak to be recognized in the presence of unavoidable noise.

Accordingly, one of the objects of my invention is to provide a method of seismic exploration which will permit the radiation of signals of sufficiently long wave length to avoid excessive absorption in the earth thereby enhancing the signals in relation to noise, and thereafter processing the records in such manner as to avoid the confusing overlap mentioned above.

A more specific object is to provide a novel method of processing seismic signals in a manner to greatly reduce their duration, thereby eliminating the overlap so as to clearly indicate on the record the arrival times of the individual reflected events.

According to the method herein described, signals of adequate wave length to avoid, in large degree, the absorption problem, are radiated in the earth. After the reflected signals are received at the detectors, they are subjected to special processing designed to convert them into very brief markers that indicate the time of arrival of the individual signals. The signals themselves are eliminated from the record, leaving only the brief markers to show the time of arrival of the signals. This conversion of the original signals into very brief markers not only permits the separation of overlapping events, but makes possible the use, as hereinafter described, of other highly effective techniques for the elimination of both random noise and the undesirable events that are unavoidably generated at each operation of the radiator of the seismic signals. The result is a record in which both the random noise elements, and the unwanted recurring events are largely eliminated, and the reflected events are replaced by brief markers of such short duration that the complications normally resulting from overlap are avoided. My invention is fully described in the annexed specification, reference being made to the accompanying drawings.

Of the drawings,

FIGS. 3 and 3A illustrate a first step in processing a record.

FIGS. 4 and 4A illustrate electrical networks useful in converting detected truncated wave train signals to terminal markers.

FIG. 5 illustrates schematically still another type of circuity for achieving the same result.

FIG. 6 illustrates a procedure for reducing pairs of terminal markers each to a single marker.

FIGS. 7 and 7A illustrate an alternative step procedure for converting a truncated wave train, as detected, into terminal markers.

FIGS. 8 and 8A illustrate still another procedure for achieving this result.

FIG. 10 illustrates another important phase of the operating procedure.

FIG. 11 illustrates a noise condition often encountered in practice.

FIG. 12 illustrates a series of sequential steps in the operating procedures.

FIG. 13 illustrates a succeeding phase of the operation.

FIG. 14 illustrates a conventional method of multiplying the frequency of an electrical function.

FIG. 15 illustrates an improved method of multiplying frequency.

FIG. 16 illustrates a further improved method of frequency multiplication.

FIG. 17 illustrates a relationship important in frequency multiplication.

FIG. 18 illustrates the importance of frequency multiplication in improving record quality.

FIG. 19 illustrates a further improvement in methods of abbreviating signals.

Figure 1:
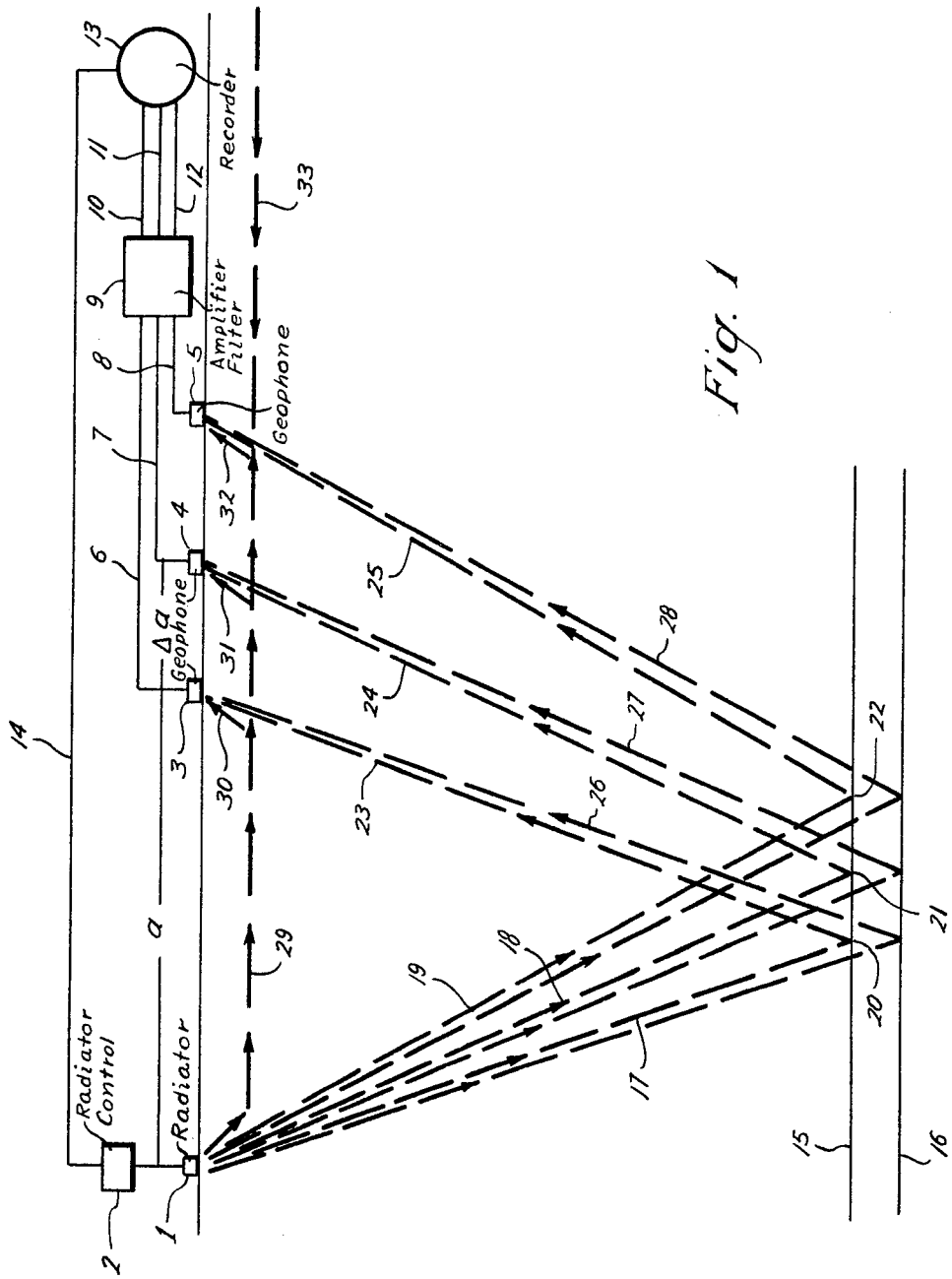
FIG. 1 illustrates a typical simplified field layout for reflection work.

FIG. 1 shows schematically a simplified field layout that illustrates the origin of certain of the difficulties mentioned above. A seismic wave radiator 1 is set in good elastic coupling with the earth and is controlled by circuitry symbolically indicated at 2, for applying to the earth signals of the types hereinatfer disclosed. At 3, 4, and 5 are shown three seismic detectors or geophones spaced apart at varying distances from the source 1, these three detectors representing a greatly simplified form of a commercial layout. These detectors are connected by wire lines 6, 7, and 8, to amplifier-filter equipment 9, and thence through lines 10, 11, and 12 to a recording device 13, preferably of the magnetic type, that rotates about its axis once each recording cycle of, for instance, about four to six seconds. A control line 14 couples the recorder 13 to the control circuitry 2. Line 14 is energized once each revolution of the recorder element, as by an electrical contact or other triggering device built into the recorder element to energize the seismic radiator 1 once during each recording cycle. This energizing of the radiator can take the form of a single impulse, or it may embrace a plurality of impulses spaced apart by small predetermined intervals to generate a sequence of impacts in wave trains as hereinafter described.

In FIG. 1 are shown two closely associated reflecting horizons 15 and 16. A signal radiated from radiator 1, exemplified by the rays 17, 18, and 19 is partially reflected from 15 at points 20, 21 and 22, and travels thence by the ray paths 23, 24, and 25 to the detectors, 3, 4 and 5 respectively. Similar reflected rays 26, 27, and 28, from horizon 16, reach the detectors at a slightly later time, the time difference being given by the formula:

$$\Delta t = (2a \cdot \sec. \theta)/V$$

where $\Delta t$ is the difference in time of arrival; ($a$) is the distance between the two reflecting horizons; $\theta$ the angle of incidence and reflection of the ray paths; and V is the velocity of elastic waves in the intervening medium. It very often happens in practice that the time interval $\Delta t$ is much smaller than the overall duration of the signal, thus giving rise to overlapping of the reflected events and presenting a major obstacle to determining the fine structure of the subsurface that is usually very important to the accumulation of oil and gas. One of the prime objects of the present invention is to provide techniques for separating these overlapping events in order that the precise time of arrival of each signal may be closely determined.

Another group of seismic waves, usually very undesirable in reflection work, is illustrated at 29. These are waves that travel in a generally horizontal direction and are diffracted to the detectors, as indicated by the ray paths 30, 31, and 32. These waves are objectionable in that they not only give no information regarding the subsurface stratigraphy but are superposed in the detectors on the vertically traveling reflected events. Very often these waves, which may be either direct traveling, as shown at 29, or reflected, as shown at 33, are of such amplitude that they completely obscure the desired reflected events. It is therefore highly desirable to exclude them from the record to as great a degree as possible. It is evident from the geometry that the time intervals between the arrival of corresponding events at the several detectors will be substantially greater for the horizontally traveling waves, than for the nearly vertically traveling reflected waves, and this fact is made the basis of a method of separating the two groups and excluding the undesirable horizontally traveling waves, as hereinafter described.

Figure 2:
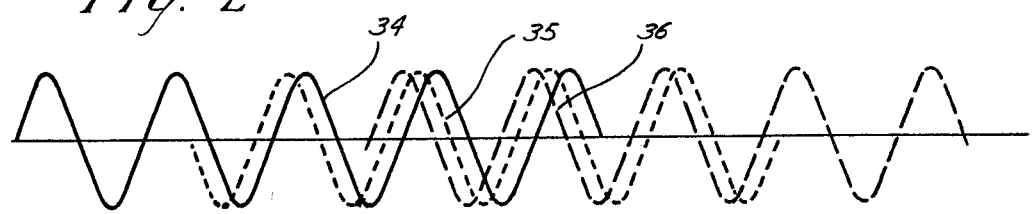
FIG. 2 illustrates graphically reflections of a signal as received by the detectors.

To illustrate the nature and importance of the problem of overlapping signals, there are shown in FIG. 2 three identical signals with a substantial degree of overlap. These signals are seen to be short truncated wave trains of only a few wave lengths duration, this being a preferred type of signal. For clarity, one signal is indicated by the solid line 34, another by the dotted line 35, and the third by the dashed line 36. The composite of these three signals, viz. the algebraic sum of the several component signals is shown at 37, in FIG. 2A. It is this composite that appears on the original record and is, therefore, the function which we must process to derive the desired information as to the number and time of arrival of the several reflected signals. It will be seen that this composite is a wave train which, even in the absence of noise, as here assumed for clarity of explanation, exhibits no distinctive characteristics that permit the determination, with any degree of certainty, of the number and time or arrival of the individual reflected signals. However, the frequency of the signal reflections will remain constant, and at the points 34x, 35x, 36x, 34y, 35y, and 36y marking terminals of the overlapping signal reflections, there will occur changes in amplitude and phase of wave energy. These characteristics are used to discriminate between different reflections, as hereafter described. In practice, this composite will almost always be accompanied by a considerable amount of both random noise, and the unwanted horizonally traveling waves above mentioned, and these further aggravate the problem of resolving the composite function into its component signals in the absence of my improved method.

The processing of the records may be accomplished in a number of different ways but in any case the first objective of the processing is to convert each of the signals into a single pulse of much shorter duration than the signal and definitely related to the time of arrival of the actual signals. The precise form of the signal used is not critical, but I prefer to use a short truncated sinusoidal wave train similar to those shown in FIG. 2, and further illustrated in FIG. 3. In practice, these wave trains may vary in length from one or two to four or five wave lengths as illustrated at 38 in FIG. 3. The first objective is to convert the sinusoidal function into the general form like that shown at 39, in FIG. 3A. Here all parts of the signal are destroyed except for the two terminal elements 40 and 41. This can be accomplished in a number of different ways which will be described in detail below. In general, however, the detected voltage function is subjected to radiated-frequency band suppression of the type which necessarily leaves the mentioned terminal transients. More specifically, such band suppression is achieved in effect by the production of counterparts of the detected signal reflections which are brought into signal cancelling opposition only between the terminal portions of the detected signal trains. The second step in the conversion consists in passing the simplified function 39, through some sort of coincidence circuit, of which many well known types are available. It is seen that the corresponding positions of the two pulses 40 and 41, are separated by a time interval exactly equal to the overall duration of the original signal, and since this duration is definitely known in advance, through control of the radiated signal, a coincidence technique can readily be devised whereby the two terminal elements 40 and 41 can be converted to a single pulse, as will be explained below.

We will now consider how the conversions mentioned above can be accomplished. One method of making the first conversion, whereby the sinusoidal function is suppressed except for two terminal pulses, is to play back the record through a type of band elimination network conventionally known as a twin T notch circuit, or a related type such as a bridge T. These are well known devices, the former being shown in its most common form in FIG. 4. It is well known that if any sustained sinusoidal wave train having the frequency which the twin T network is designed to eliminate, be passed into the network, the entire wave train will be eliminated, except for the transients 40 and 41. The network is designed to advance the voltage phase 90 degrees in the circuit branch $g, k, j$ due to the action of capacitators $c$ and $e$ and to retard the phase 90 degrees in the branch $g, o, m, j$ due to the capacitator $d$ in shunt $m, n$. The split voltage functions, now 180 degrees out of phase, are mixed at $j$ prior to recording. For steady state operation of the network, the mixed inverted functions will mutually cancel each other. However, at points 34x, 35x, 36x, 34y, 35y, and 36y marking the ends of the overlapping wave trains (FIG. 2A), brief pulses will occur on the record, at the positions shown in FIG. 9 at 34a, etc.

The conversion of the seismic signal into two brief terminal events makes it possible to determine the time of arrival of the signal even in the case of overlap, with much greater accuracy than can be accomplished with the original records. However, the record can be further simplified when desired, by the use of further processing which converts the pair of transients into a single brief event.

For converting these two derived terminal events into a single pulse, I may use any of a number of known coincidence techniques, of which the following is typical. The function is played back from a recording through two playback heads, 42 and 43 of FIG. 6 which shows the terminal pulses of FIG. 3A resultant from use of the devices of any of FIGS. 4, 4A, and 5 as well as 7 and 8 and the related methods superimposed on playback and recorder instrumentalities. These playback heads are spaced spaced apart by an interval (a) equal to the overall duration of the original signal, which, as stated above, is equal to the spacing between corresponding elements of the two terminal pulses. It will be seen that as the record 44 passes in the direction of the arrow 45, first the pulse 40, and then 41, will pass in sequence under the two playback heads, but at only one position, that shown in FIG. 6, will both of the events 40 and 41, be played back at the same time. If the outputs from the two playback heads be led into the two input terminals 46 and 46a of any type of coincidence network, as for example, the voltage function multiplier represented at 47, it will readily be seen that there will be no output except during the brief interval when the relationships are as shown in FIG. 6. At that time the output applied to recording head 48 will be a single brief pulse 49 having a duration of approximately one half wave length of the original signal. Other coincidence techniques may be used for the purpose.

Figure 2A:
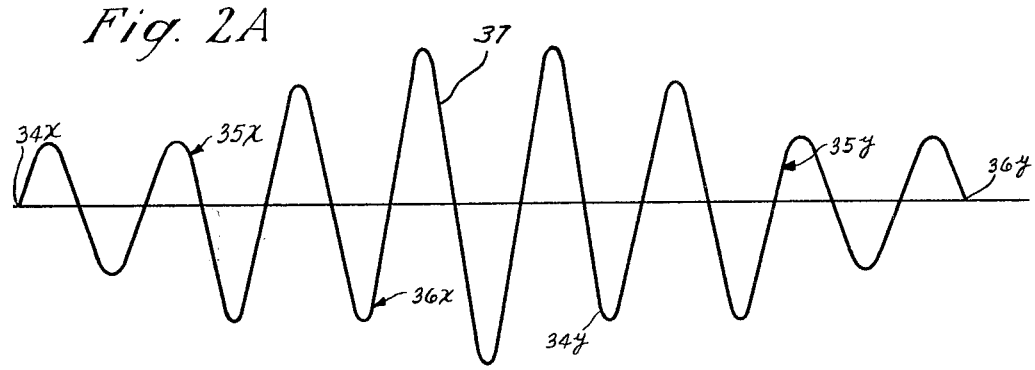
FIG. 2A illustrates the complex wave form as actually detected and illustrating the problem of overlapping signals.

An alternative circuit for converting a sinusoidal truncated wave train into two brief terminal transients is illustrated in FIG. 4A. Here the wave train is sent into the input terminals 50 of a resonant shunt type band suppression network comprising a series resistance 51 in first branch p, r, q, and a resonant shunt circuit r, s consisting of a capacitor 52, and an inductance 53. The resonant frequency of the shunt circuit is made equal to the frequency of the signal that is to be suppressed. When a detected voltage function, as in FIG. 2A, is impressed on terminals 50, a substantial voltage will occur in line r, s which will react upon the recorder to form the pulse 40 (FIGS. 3A and 6). Upon charging of condenser 52, after a half wave length or less in time, an opposing counterpart voltage will be developed in branch r, s which will, in effect, algebraically cancel the voltage of the signal analog counterpart in line p, r, q removing voltage from the recording head attached at 54. The output at terminals 54 will then be substantially like that shown at 40 and 41 in FIGS. 3A and 6. This output may be processed in the same manner as described above to convert the two terminal transients to a single brief pulse.

A truncated sinusoidal wave train, also may be converted to terminal pulses by the delay circuit illustrated in FIG. 5. Here, the detected signal is passed through a line 50a directly to recorder 54a. The signal is split and a portion thereof passes through a branch lead 51a to a conventional electric delay device 52a wherein it is shifted 180° in phase. The shifted signal is then superimposed on the original signal in line 50a so that the signal, as recorded, will be in opposition and canceled except for the terminal half pulses. The result is graphically illustrated in FIG. 8, to be further discussed hereafter.

A fourth method of converting a truncated sinusoidal wave train to a pair of terminal transients is illustrated in FIGS. 7 and 7A. The signal 55 is recorded and played back through two playback heads, 56 and 57, spaced apart exactly one half wave length and connected in series. As the signal 55 passes in the direction of the arrow 58, the first half wave 59 is first played back by the head 57, giving the half wave event 60, in FIG. 7A. Following this it will be seen that while one head is playing back any part of the train, the other head will be playing back precisely the same part of the adjacent half wave having opposite polarity and since the heads are connected cumulatively, the voltage of one head exactly cancels the other, so that the voltage output will be zero as long as both playback heads are associated with the signal wave train. This condition prevails until the head 57 passes off the end of the wave train, when the last half wave 59a will be played back by the head 56 alone, when there will be an output as shown at 61 in FIG. 7A.

A fifth method of accomplishing this conversion consists in shifting the record by one half wave length and adding this shifted record to the original record, as illustrated in FIGS. 8 and 8A. The records 62 and 63 thus cancel each other except for the terminal half waves 64 and 65, which survive, as illustrated in FIG. 8A. This shift can be accomplished in a variety of ways, as by the use of conventional electrical delay lines, as in FIG. 5, or by recording the record twice on parallel tracks and playing them back through two playback heads spaced apart by one half wave length. In either case, the result is a record comprising only the two pulses 64 and 65 in FIG. 8A.

All of the alternative methods disclosed in FIGS. 4, 4A, 5, 7, and 7A, and 8 and 8A are generally equivalent in that in each the sinusoidal, truncated wave train reflections as detected are in effect, eliminated except for brief terminal pulses, either by delayed mutual cancellation or shunting of the signal frequency. This is functionally as true of the filter type frequency circuits of FIGS. 4 and 4A as it is in FIGS. 5, 7, and 8. The result is that in each form the major intermediate portions of all signal reflections are minimized while only the terminal half waves are conserved. Regardless of which of the above described methods may be used for converting the signals into pairs of pulses, these pairs are converted to a single pulse by the method disclosed in reference to FIG. 5 or by related methods.

Figure 9:
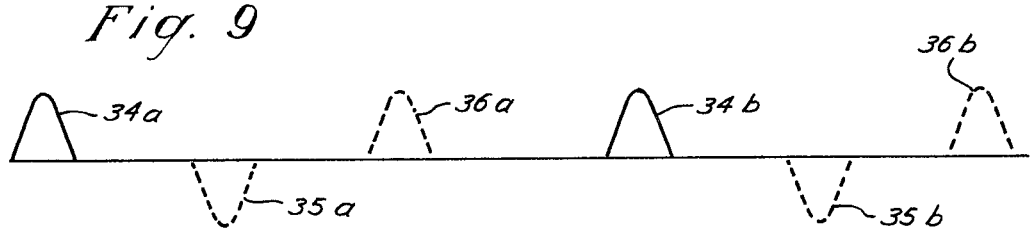
FIGS. 9 and 9A illustrate the result of applying the above techniques to a complex record.
Figure 9A:
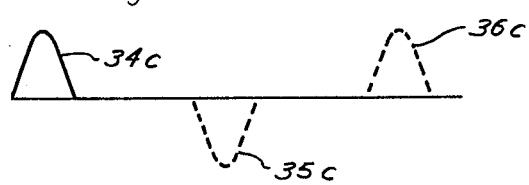

The application of the principles above described for the separation of overlapping events is further illustrated in FIGS. 9, 9A, and 10 considered in relationship to FIGS. 2 and 2A. If we play back the composite form record 37 of FIG. 2A and pass it through any suitable train elimination network, as outlined above, as for example that shown in FIG. 4, the central components in each of the three truncated wave trains will be eliminated, leaving a pair of terminal transient pulses at the terminals of each of the three signals. FIG. 9 shows the signal 34 converted to the two terminal pulses 34a and 34b; the signal 35 converted to the pulses 35a and 35b; and the signal 36 converted to the pulses 36a and 36b. The record of FIG. 9 can be further simplified by processing by the method illustrated in FIG. 6. This converts each pair of pulses into a single pulse, thereby giving the record shown in FIG. 9A, wherein the three brief pulses 34c, 35c, and 36c of one half wave length duration, replace the complex composite of the three original overlapping events shown in FIG. 2A. These three events are seen to stand out clearly without overlap so that they entirely eliminate the confusion due to the overlap of the original signals.

The techniques hereinabove described have been found to yield satisfactory results in areas where the noise associated with the signals is not too great. However, in areas where these conditions are not met, the quality of the final processed records may become unsatisfactory. In such cases the processing techniques hereinabove described lay the foundation for further processing that is capable of disclosing the presence and time of arrival of signals under much more difficult conditions. These further processing techniques are set out below.

In order to describe these further processing procedures, we apply them to the group of three overlapping signals as in FIGS. 2 and 2A, but we now assume that a large amount of noise is superposed on the signals. Normally, in records taken directly from the seismic detectors the noise will embrace a wide range of frequencies. However, it is practicable by the use of frequency discrimination techniques to suppress most of the noise except in the frequency range close to the frequency of the signals. We will then have to deal with noise components that have the character of truncated wave trains that are substantially random as to amplitude, time of arrival, and overall duration, but have a frequency close to that of the signal. When this record is processed in the manner hereinabove described, the signals will first be converted to a pair of terminal pulses and later to a single pulse, as described above in reference to FIGS. 5, 9 and 9A. The noise components will similarly be converted to pairs of pulses, but with an important difference. First, let us suppose that the noise has the same frequency as the signals. In this case any noise component, obviously, will be converted into a pair of terminal pulses, but since these pulses are separated in time by the duration of the noise pulse, this separation will, to a high degree of probability, be different from the separation in the case of the signals. The result is illustrated in FIG. 10. Here the terminal pulses resulting from the first conversion operation above described will have varying spacing depending on the lengths of the wave trains. The pair of terminal pulses 72 and 73, derived from any signal will have a known separation equal to the signal duration, which is always definitely known. The pair of pulses 74 and 75, derived from a noise wave train will, in general, have a different spacing, as shown. When we subject these to any of the coincidence techniques referred to above, such for example as playing the record back through two playback heads spaced apart by an interval exactly equal to the duration of the signal wave train as described above, the two terminal pulses 72 and 73 derived from a signal train will be converted to the single pulse 76. However, the pulses 74 and 75 derived from the noise will, in general, have a different spacing from that of the playback heads so that neither of these pulses will survive the operation described in reference to FIG. 6, and hence only the signals will be conserved. In actual practice, certain of the noise elements will have a duration virtually the same as that of the signals and will then be conserved along with the signals. These noise elements can be eliminated by further processing, as explained later in reference to FIG. 12.

The above analysis presupposed that the noise components have the same frequency as the signal. While this condition can be approximately realized by the use of conventional frequency discriminating devices, the noise frequency will, in general, be slightly different from that of the signals. We will now examine the effect of this deviation in frequency. In FIG. 11, there is shown at 77, a truncated wave train that has a frequency somewhat different from that of the signals. To make the comparison quantitatively accurate, we assume that the frequency of the noise is ten percent higher than that of the signal. If now we process this record by any of the above described techniques for converting the wave train into two terminal pulses, as for example, the technique described in reference to FIGS. 7 or 8, we note that the actual phase shift between the original wave train 77 and its shifted counterpart 78 in FIG. 11, is slightly less than a half wave length of the noise wave train, being exactly one half wave length of the signal wave train. The result, therefore, will not be a perfect cancellation of the sinusoidal components of the noise train. The residual noise resulting from this operation when the frequency of the noise differs from that of the signal by ten percent, is shown at 79 in FIG. 11. Here the amplitudes of the residual pulses 80 and 81 are the same as the amplitude of the original noise wave train and it is evident that the amplitude of the residual wave train shown at 79 is greatly reduced, although not entirely eliminated. It is evident therefore, that if a high degree of noise suppression is to be achieved by these techniques, it is necessary to precede the use of these techniques by measures that will limit the noise largely to frequencies close to that of the signal. Conventional filters are available for accomplishing this. It is here assumed that such filters are used.

Referring now to FIG. 12, we assume that the record on track 83 has been processed accordnig to the techniques hereinabove described, with the result that there will remain on the record only single pulses representing their original wave trains, some of which will be signals and some noise. For the purpose of this disclosure we assume that pulses 84, 85 and 86 are signals that will recur on all records taken at the same location while events 87 to 97 inclusive are assumed to be noise. These will therefore occur at random times on the record. With only a single record, as here shown, it is impossible to determine which of the pulses are derived from signals and which from noise. After taking and processing the first record, as on track 83, we next take a second record at the same location. This second record is shown on track 98. Obviously, this record will have the same signals 84', 85' and 86', but in general, a different set of noise elements, such as 99 to 103, some of which, however, may occur at the same time as some of the noise pulses on track 83, as here shown for illustrative purposes. We now subject tracks 83 and 98 to any type of coincidence processing, as above described, whereby all events that occur at the same time on the two tracks will be conserved, while all events on either record that do not have a matching event on the other track will be eliminated. We then have the record shown on track 104. It will be seen that all three signals have been conserved, while all but two of the noise pulses, viz. the combination 91 and 99, and 95 and 102, have been eliminated. At this stage it is still uncertain as to which of the conserved pulses are signals and which are noise. We therefore take a third record at the same location and process it in the same manner and get the record shown on track 105. Tracks 104 and 105 are now subjected to coincidence processing in the same manner as before, thereby giving the record on track 106, where it is seen that only the signal pulses 84, 85 and 86 remain. If there remains any doubt as to whether all of these are recurring signals, still another record can be taken at the same location and processed in the same manner, the routine being repeated until all doubt as to the origin of the residual pulses is eliminated.

In using the coincidence techniques I have found it very advantageous to proceed along the following lines. A plurality of independent records is made at substantially the same place, so that all of the records will contain the same signals but different random noise patterns. These are divided into small groups and each group is passed through a coincidence process, as hereinabove described. For example, I may make nine primary records and after processing them as above described to convert both signal and noise elements into single pulses, the records are taken in small groups preferably three to a group, and each group is subjected to any suitable coincidence technique. As a specific example, the nine primary records are numbered 1 to 9 inclusive, and Nos. 1, 2 and 3, may be taken as a first group; Nos. 4, 5 and 6, as a second group; and Nos. 7, 8 and 9, as a third group. Each of these groups is subjected to coincidence processing in the manner hereinabove described after which a composite is made of all three of the groups so processed. In many cases where noise is a very serious problem, all possible combinations of three units each that can be made from the original nine records are used. It can readily be shown that a total of eighty-four such groups of three can be made from the nine primary records without duplication. A final composite is made of all these groups after the coincidence processing is completed.

In the foregoing we have dealt with two of the major problems mentioned in the preamble to this specification, viz. random noise and overlapping signals and have shown how the technique, as hereinabove, set out, can be made very effective in meeting both these problems. We will now show how these same principles can be used to greatly minimize the problem presented by recurring noise in the form of horizontally traveling waves that are generated by the seismic radiator each time it is energized to generate the desired vertically traveling waves. The problem can best be understood by considering the geometry of the system as shown in FIG. 1. Here the seismic radiator 1 radiates the useful vertically traveling waves represented by the rays 17, 18 and 19, which are reflected from the boundary 15 to the detectors 3, 4 and 5. In practice, the geometry of the ray paths is usually such that the difference in time of arrival of the reflected rays at the several detectors is very small compared to the wave length of the signal being radiated, so that the slight difference in time of arrival at the different detectors may be neglected. If, in any case, this is not the case, a correction can easily be applied, by well known means, so that for all practical purposes we may assume that the reflected rays reach the several detectors simultaneously, and this assumption is made in the present discussion. The problem now under consideration is due to the horizontally traveling waves 29. Since these waves travel substantially parallel to the surface of the earth and are diffracted upward to the several detectors in sequence, the time of arrival of these waves at the several detectors will vary considerably depending on the spacing of the detectors and the velocity of the waves in the near-surface horizons. In any case, the intervals between arrivals at the several detectors will be much greater than in the case of the reflected waves. The seismic waves received at the several detectors, or groups of detectors, are recorded separately, and each record is processed separately in the manner described above, to convert the wave trains into single brief pulses. The spacing between the several groups of detectors is made such that the travel times between adjacent groups is greater than the duration of the brief pulses derived by processing the records, so that they will appear as separate and distinct events with random time spacing. The vertically traveling signals will, however, reach all of the detector groups at virtually the same time. Therefore, by the application of the coincidence techniques, as above set out, these unwanted horizontally traveling events can be eliminated from the record. This is illustrated in FIG. 13 where the records from any two detector groups are shown on tracks 115 and 116. Any vertically traveling reflected events will appear on the two tracks at virtually the same time as at 117 and 118, while undesired horizontally traveling events will appear at different times as at 119 to 122 inclusive. We therefore subject the two records to any suitable coincidence processing, as hereinabove described, and thereby eliminate the unwanted horizontally traveling events 119 to 122 inclusive, while conserving the desired vertically traveling signals 117 and 118.

In applying coincidence techniques, as set out above, for the elimination of unwanted events from the record, while conserving desired signals, the duration of the events being processed is of prime importance, if the complications due to overlap are to be avoided. It is for this reason that we are unable to apply the techniques to the original record, the duration of the signals being, in general, altogether too long, the result of the processing being a further scrambling of the overlapping components. The techniques hereinabove described make it possible to greatly abbreviate the signals and thereby minimize the problems resulting from overlap. However, in many practical cases, further abbreviation of the signal is necessary in order to reduce these complications to permissible limits. Such further abbreviation can be accomplished as described below.

One practical method for such further abbreviation of the signals, while avoiding the limitations due to absorption, comprises the radiation of long wave lengths, and after these have been received at the detectors the frequency is increased by electrical processing. Once the signals are obtained as electrical analogs of the seismic waves, the limits imposed by seismic absorption no longer exist. There are numerous ways of multiplying the frequency of an electrical function, one of which consists of multiplying the function by itself. This operation is illustrated in FIG. 14, which may be regarded as part of a complete system also including the device of any of FIGS. 4, 4A, 5, 7 and 8. The electrical signal, the frequency of which is to be multiplied is sent into the input terminals 123 of a conventional voltage function multiplier 124. This multiplier multiplies the function by itself. It is here assumed, as elsewhere in this specification, that we are dealing with signals that are sinusoidal functions, or composites of a plurality of such functions. It can readily be shown that if a sinusoidal function be multiplied by itself the product will embrace a sinusoidal function having twice the frequency of the original signal as well as squared voltage values. This double frequency function will appear at the output terminals 125 of the multiplier 124 of FIG. 14, although unless proper precautions are taken, as hereinafter set out, the function may be seriously damaged for the purposes herein considered, by the multiplication operation. The essential aspects of the operation, insofar as they relate to the processing of seismic records, are disclosed by the following analysis.

For our purpose we assume a simple sinusoidal function, as given by Equation (1):

$$f(t) = m \sin wt + n \sin (wt + \theta) \qquad (1)$$

This represents a sinusoidal function having a random phase position depending on the relative values of $m$, $n$ and $\theta$. This function, when subjected to simple trigonometric conversion takes the form shown in Equation (2):

$$f(t) = (m + n \cos \theta) \sin wt + n \sin \theta \cos wt \qquad (2)$$

We first show the result of multiplying this function by itself, using a conventional voltage function multiplier, as suggested in FIG. 14. The output of the multiplier will be a voltage function that consists of the squares of the instantaneous ordinates of the input function. This output is indicated in Equation (3):

$$[f(t)]^2 = [(m + n \cos \theta) \sin wt + n \sin \theta \cos wt]^2 \qquad (3)$$

By simple trigonometric transformation Equation (3) reduces to $$[f(t)]^2 = A + B \cos 2wt + C \sin 2wt \qquad (4)$$

where A, B, and C are functions of $m$, $n$, and $\theta$.

It is now seen that the frequency of the function has been doubled, which was the object sought. However, it will also be seen that in addition to the double frequency components, Equation (4) now contains the constant term A. This means that the function now contains a D.C. component superposed on the double frequency components. This D.C. component is very objectionable, particularly if any further processing, such as that hereinabove described is contemplated. To illustrate this, we assume, as will usually be the case, that we wish to again double the frequency of Equation (4) thereby obtaining a function having a frequency four times that of the original function. When this is done we will have the function shown in Equation (5):

$$[f(t)]^4 = [A + B \cos 2wt + C \sin 2wt]^2 \qquad (5)$$

This readily reduces to:

$$[f(t)]^4 = a + b \cos 2wt + c \sin 2wt$$
$$+ d \cos 4wt + e \sin 4wt \qquad (6)$$

where $a$, $b$, $c$, $d$ and $e$ are constant functions of the original constants $m$, $n$, and $\theta$.

Equation (6) is seen to embrace three groups of terms. The first is a constant and expresses the fact that the output of the multiplier contains a D.C. voltage; the second group which comprises the second and third terms has a frequency twice that of the original signal; and the third group embracing the fourth and fifth terms has a frequency four times that of the original signal. Only the last two terms are desirable. Further, a qauntitative examination of the several terms discloses that the undesirable terms, one to three inclusive, are of much greater magnitude than the desirable terms, and these tend greatly to obscure the signals. It is obvious therefore that if this method of frequency multiplication is to be used we must provide means for suppressing the unwanted components.

An inspection of Equation (4) reveals that if the constant term A can be eliminated, the rest of the function will be of the same character as the original Equation (2) except that the frequency has been doubled. It follows therefore that if the constant term is eliminated from Equation (3) after the first multiplying operation, the unwanted terms in Equation (5) viz. the first three terms, will not appear, leaving only the last two terms, which have the same character as the input function (2) except that frequency has again been doubled, and is now four times the original frequency. This process can be repeated sequentially, until the desired frequency is obtained.

We will now consider how the objectionable constant term in Equation (2) can be minimized or eliminated. Since the constant term is essentially a D.C. component, it can be greatly minimized by passing the output of the first multiplier through a conventional high pass filter. However, if enough such filtering be used to virtually eliminate the D.C. component, the function will be damaged for further processing. A much more effective method which entirely eliminates the objectionable constant without damaging the record to any appreciable degree is illustrated in FIG. 15. The function, the frequency of which is to be multiplied, taken, for instance, from the playback head 126 on a primary record 127, is led into both input terminals 128 and 129 of a voltage function multiplier 130, through isolating means such as the transformers 131 and 132. The output terminals 133 of the multiplier are connected through the transformer 134, and the midpoint of the primary of this transformer is grounded, as shown at 135. Preferably, also the midpoints of the input transformers 131 and 132 are grounded, as shown at 136 and 137. With this arrangement the output at terminals 138 of the transformer 134 will be free of D.C. components and will be in all respects like the original input function except that the frequency will be doubled. This process can be repeated any number of times to obtain any desired frequency. FIG. 15 shows the frequency multiplied function led into filter equipment 139, as suggested in connection with FIGS. 4, 4A, and 5, for suppressing all but terminal pulses of the multiplied function and then through a coincidence network 140 and, optionally, through differentiation circuitry 141 to a rerecording head 142. It will be understood that the frequency multiplication and coincidence network steps may be repeated, as herein explained. The purpose of the differentiation circuit will be explained hereafter in connection with FIG. 19.

The method of frequency multiplication above described is very useful under certain conditions, but it is also subject to certain limitations. In all cases in which the noise is not much greater than the signals the results obtained by this method have been found to be very satisfactory, chiefly for separating overlapping signals. When, however, the problem is one of noise not eliminated by filtration rather than overlapping signals, this method of frequency conversion is not suitable. The reason is simply that in any case where a function is raised to a power higher than unity, the elements having the larger amplitudes will be enhanced in amplitude in much greater degree than smaller elements. For example, the first operation under the process raises all elements of the function to the second power. Thus, if a noise element be originally twice the amplitude of a signal, after being squared, the noise element will be four times the amplitude of the signal, and after the second operation it will be sixteen times the amplitude of the signal. Conversely, if the signals be larger than noise there will be still further improvement in signal-noise ratio. Further, it can readily be shown that this method of frequency multiplication results in greatly increasing the complexity of the record by generating a large number of new frequencies involving the noise elements. This method is therefore limited to cases where noise is not large in relation to the signal. Under such conditions it results in an excellent signal-noise ratio and is very effective in laying the groundwork for separating overlapping signals. In all cases where noise is a major problem, other methods of multiplying the frequency must be used. I have developed another method that is free from this limitation and this method is described below.

FIG. 16 illustrates the essential elements of this method. Instead of multiplying the signal function by itself, as above described, I multiply the function by a sustained sinusoidal wave train, hereinafter called an operator, this operator having a frequency equal to that of the signal being processed. The seismic function being processed is led into one of the input terminals 143 of the multiplier 144, through the transformer 145. This seismic function will, in general, consist of signals of a definite known frequency as hereinabove disclosed. The sustained sinusoidal operator having the same frequency of the signal is sent into the other input terminals 146 of the multiplier 144 through a transformer 147. Preferably the seismic record is played back from a recording, and the operator is also recorded on and played back from the same recorder unit, or otherwise interlocked with the signal being processed, as to both frequency and phase. This assures a constant phase relationship between signals and wave train when a plurality of records taken at the same location is being processed. The output from multiplier terminals 148 and transformer 149 will embrace the signals in the the original record but the frequency will be doubled. Here, as in the case of FIG. 15, the midpoints of the primaries of the input and output transformers are grounded to guard against any D.C. components in the output of the multiplier.

In cases where doubling of the frequency of the original signals is sufficient, the single stage operation above described will be sufficient. However, it will usually be desirable to multiply the frequency further and this is accomplished by multistaging the operation in the following manner.

Again referring to FIG. 16, the output from transformer 149 is connected to one input 150 of a second voltage function multiplier 151. Into the other input 152 of this multiplier is led, through the transformer 153, a second operator in the form of a sustained sinusoidal wave train having exactly twice the frequency of the first operator used above. Preferably this second operator should be phase locked with respect to the first operator, and in such relationship that alternate zero points of the second operator will coincide with the zero points of the first operator, as shown in FIG. 17, where 154 is the first operator and 155 is the second operator. The signal output of the second multiplier 151 (FIG. 16) is passed through the transformer 156, the primary of which is grounded at its center point, as shown at 157. The output at the terminals 158 will have four times the frequency of the original signal, and will be free of all lower frequency and D.C. components. Also, there will be no enhancement of the noise with respect to the signals, so that the method can be used in cases where the signal-noise ratio is very low.

The importance of this frequency multiplication is illustrated in FIG. 18. Here the original signal 160 has the relatively low frequency of the radiated signal, designed to minimize absorption. When this signal is converted, first to the terminal pulses shown dotted at 161 and 162, and then to the single pulse 161, by the techniques hereinabove described, we will have reduced the original signal to a pulse having a duration of one half wave length of that signal or less. After quadrupling the frequency, as above described, and making the same pulse conversions, as shown at 163 and 164, and then to the single pulse 163, we will have only the pulse 163, that is only one fourth the duration of the half wave length 161 or less. This very narrow pulse facilitates enormously the separation of overlapping events by the coincidence techniques hereinabove described.

By using the techniques of pulse generation by band suppression filtration, as described above with reference to FIGS. 4 and 6, still further abbreviation of the signal can be obtained at any stage of the process by passing the signal through a simple conventional differentiation network, as suggested at 141 in FIG. 15. The methods of isolated pulse generation illustrated by FIGS. 4 and 4A yield pulses that differ radically in wave form from the sinusoidal half waves from which they are derived in that the beginning of the pulse is very steep, while later portions of the pulse become progressively less steep. In other words, the derivative of the pulse voltage with respect to time is a maximum near the beginning of the pulse. This is illustrated in FIG. 19, where 165 is the pulse derived as hereinabove described, and 166 is the first derivative. By the use of this differentiation technique, either alone or in combination with frequency multiplication, as above described, virtually any degree of abbreviation of the signal can be obtained.

While the full processing combination, as shown in FIG. 15, may be necessary in some situations to adequately clarify the final record, in others one or more of the steps may be omitted, or alternative instrumentalities substituted therefor. The various steps judiciously applied will result in a record which will permit fine discrimination between wanted reflections, even where the originally detected signal is largely obscured by noise or unwanted recurring events which have defied clarification by previous methods. Various electrical and mechanical features are well known and may be modified as will occur to those skilled in the art. The exclusive use of all such modifications as come within the scope of the appended claims is contemplated.

I claim:

1. The method of seismic prospecting comprising radiating in the earth at least one truncated wave train signal of fixed frequency and amplitude and predetermined duration, detecting subsurface reflections of said signal, subjecting the detected signal reflections to signal frequency band suppression of the type to leave unsuppressed the terminal pulses of wave trains at said signal frequency, and recording the residual terminal pulses of the detected signal reflections.

2. The method of seismic prospecting described in claim 1 in which said band suppression step includes the formation of a pair of counterparts of the detected signal shifted apart in time, prior to recording, approximately a half cycle.

3. The method of seismic prospecting described in claim 1 in which said band suppression step includes the formation of a pair of counterparts of the detected signal shifted apart in time approximately a half cycle, and mixing said counterparts prior to recording.

4. The method of seismic prospecting described in claim 1 in which said band suppression step includes transforming the detected reflections into electrical counterparts thereof out of phase approximately a half cycle and mixing the opposing counterparts prior to recording.

5. The method of seismic prospecting described in claim 1 in which said band suppression step includes transforming the detected reflections into electrical counterparts separated in time approximately a half cycle, one of said counterparts being recorded in terminal parts and being intermediately cancelled by interaction of the other counterpart.

6. The method of seismic prospecting described in claim 1 in which said band suppression step includes transforming the detected reflections into electrical counterparts separated in time approximately a half cycle, the later of said counterparts serving to algebrically cancel the earlier counterpart between the terminal half cycles thereof.

7. The method of seismic prospecting described in claim 2 further including coincidence filtration of the detected reflections between the band suppression and final recording steps for reducing terminal pulses marking each signal reflection to a single brief marker.

8. The method of seismic prospecting described in claim 1 in which the signal band suppression step is achieved by initially recording the detected signal reflections, playing back the initial recording by means of playback heads spaced apart one-half cycle, and making the final recording from the mixed outputs of said playback heads.

9. The method of seismic prospecting described in claim 1 in which the signal band suppression step is achieved by initially making duplicate records of the detected signal reflections, playing back both of said duplicate records, and making the final recording from the mixed outputs of playback heads associated respectively with said duplicate records and spaced apart 180 degrees in time with respect thereto.

10. The method described in claim 4 including the further step of multiplying the frequency of the detected signal reflections prior to the band suppression step for reducing the duration of the conserved terminal pulses.

11. The method described in claim 10 including the further step of passing the detected signal reflections through inductively coupled coils with the primary coil grounded for eliminating direct current components.

12. Seismic prospecting apparatus comprising a vibrator for radiating in the earth a truncated wave train signal of fixed frequency and amplitude and predetermined duration, geophone means for detecting reflections of said signal and transforming the detected energy into an electrical analog thereof, recording means, wiring connecting said geophone and recording means, and signal band suppression means in said wiring of the type for converting each detected signal reflection, as applied to said recording means, into isolated terminal pulses, said band suppression means including branched, record-cancelling circuits and delay means in at least one of said circuits for limiting the cancellation effect of said circuits upon said recording means substantially to the intermediate portions of said signal reflections.

13. Seismic prospecting apparatus as described in claim 12 in which said branched circuits are connected in advance of said recording means for mixing the out-of-phase signal counterparts carried thereby for cancellation of the intermediate parts of the recorded signal reflections.

14. Seismic prospecting apparatus as described in claim 12 in which said delay means includes a capacitor in one of said branched circuits, which latter circuit, under steady state conditions, is resonant to signal frequency whereby brief pulses are applied to the resultant record due to charging and discharging of said capacitor at the ends of the detected wave train signal reflections and upon any change in the amplitude and/or phase thereof indicating the terminal of an overlapping wave train.

15. Seismic prospecting apparatus as described in claim 12 in which said band suppression means comprises a twin T notch band suppression network.

16. Seismic prospecting apparatus as described in claim 12 in which said band suppression means comprises a resonant shunt network.

17. Seismic prospecting apparatus as described in claim 12 in which said band suppression means comprises first recording means for making a first record of the detected signal reflections, a pair of playback heads associated with said first record and spaced 180 degrees apart, and second recording means connected to both of said playback heads for making a mixed record of the outputs thereof.

References Cited by the Examiner

UNITED STATES PATENTS

| | | | |
|---|---|---|---|
| 2,193,769 | 3/1940 | Minton | 181—0.5 X |
| 2,450,352 | 9/1948 | Piety | 340—15.5 |
| 2,978,673 | 4/1961 | Graham. | |
| 3,020,970 | 2/1962 | Hasbrook | 181—0.5 |
| 3,045,180 | 7/1962 | Losher | 324—77 |
| 3,185,958 | 5/1965 | Masterson et al. | |

BENJAMIN A. BORCHELT, *Primary Examiner.*

M. F. HUBLER, *Assistant Examiner.*